(12) United States Patent
Kono et al.

(10) Patent No.: US 8,593,094 B2
(45) Date of Patent: Nov. 26, 2013

(54) POWER CONVERSION APPARATUS OF ELECTRIC VEHICLE

(75) Inventors: Masaki Kono, Tokyo (JP); Keita Hatanaka, Tokyo (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 59 days.

(21) Appl. No.: 13/502,528

(22) PCT Filed: Nov. 25, 2009

(86) PCT No.: PCT/JP2009/069854
§ 371 (c)(1),
(2), (4) Date: Apr. 18, 2012

(87) PCT Pub. No.: WO2011/064846
PCT Pub. Date: Jun. 3, 2011

(65) Prior Publication Data
US 2012/0212163 A1    Aug. 23, 2012

(51) Int. Cl.
*H02P 6/14*    (2006.01)
(52) U.S. Cl.
USPC ............ 318/400.26; 318/400.02; 318/400.22; 318/779; 318/434; 318/783
(58) Field of Classification Search
USPC .......... 318/400.02, 400.26, 779, 400.22, 783, 318/434
See application file for complete search history.

(56) References Cited

U.S. PATENT DOCUMENTS

| | | | |
|---|---|---|---|
| 5,861,728 A * | 1/1999 | Tazawa et al. | 318/778 |
| 5,977,742 A | 11/1999 | Henmi | |
| 2008/0169775 A1* | 7/2008 | Kono et al. | 318/135 |

FOREIGN PATENT DOCUMENTS

| | | |
|---|---|---|
| JP | 4-8192 A | 1/1992 |
| JP | 4-364384 A | 12/1992 |

(Continued)

OTHER PUBLICATIONS

International Search Report (PCT/ISA/210) issued on Feb. 9, 2010, by Japanese Patent Office as the International Searching Authority for International Application No. PCT/JP2009/069854.

(Continued)

*Primary Examiner* — Lincoln Donovan
*Assistant Examiner* — Bickey Dhakal
(74) *Attorney, Agent, or Firm* — Buchanan Ingersoll & Rooney PC

(57) ABSTRACT

A power conversion apparatus of an electric vehicle includes: a power converter for driving an induction machine based on arbitrary d- and q-axis voltage commands Vd* and Vq*, and a control unit for controlling the power converter based on a power running command P and a brake command B from outside. The control unit includes: a dq/three-phase conversion unit for converting phase current information iu, iv, and iw detected from the induction machine into d- and q-axis current detection values id and iq on orthogonal rotating coordinates; a speed determination unit for computing d- and q-axis voltage commands Vd* and Vq* for the power converter and determines that speed of the induction machine is zero based on the power running command P, the brake command B, and the d- and q-axis current detection values id and iq; and a resistance computing unit for computing a resistance value of the induction machine based on the power running command P, the d-axis current detection value id, and the d-axis voltage command Vd* when the brake command B is changed to the power running command P and the speed determination unit determines that the speed of the induction machine is zero.

4 Claims, 14 Drawing Sheets

(56) References Cited

FOREIGN PATENT DOCUMENTS

| | | |
|---|---|---|
| JP | 5-297079 A | 11/1993 |
| JP | 11-262102 A | 9/1999 |
| JP | 2007-189897 A | 7/2007 |

OTHER PUBLICATIONS

Written Opinion (PCT/ISA/237) issued on Feb. 9, 2010, by Japanese Patent Office as the International Searching Authority for International Application No. PCT/JP2009/069854.

* cited by examiner

FIG.7
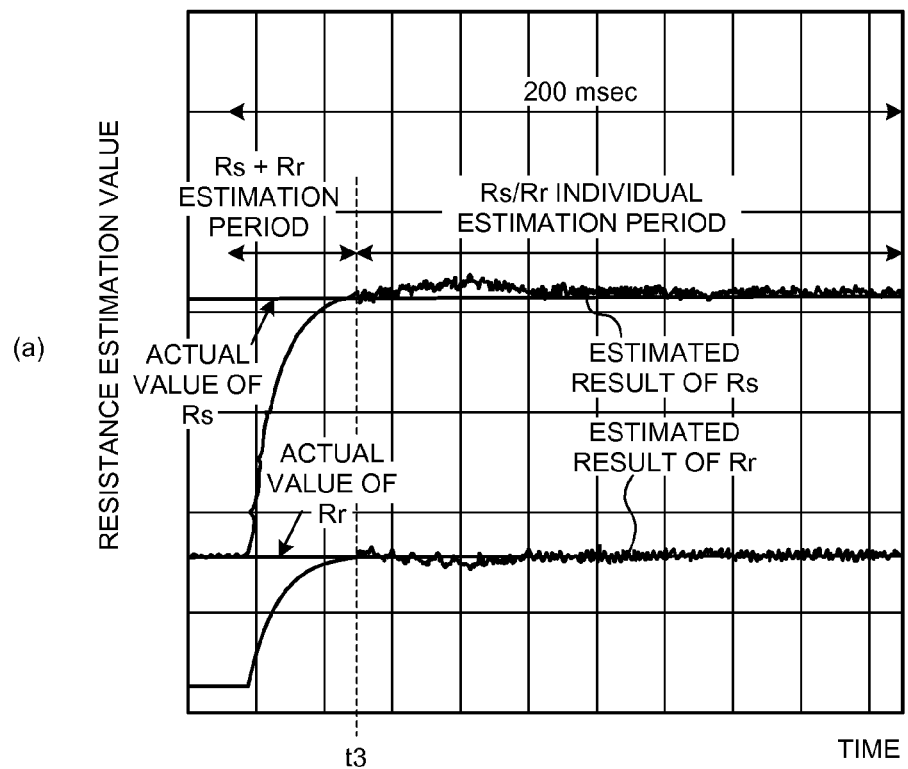
(a)
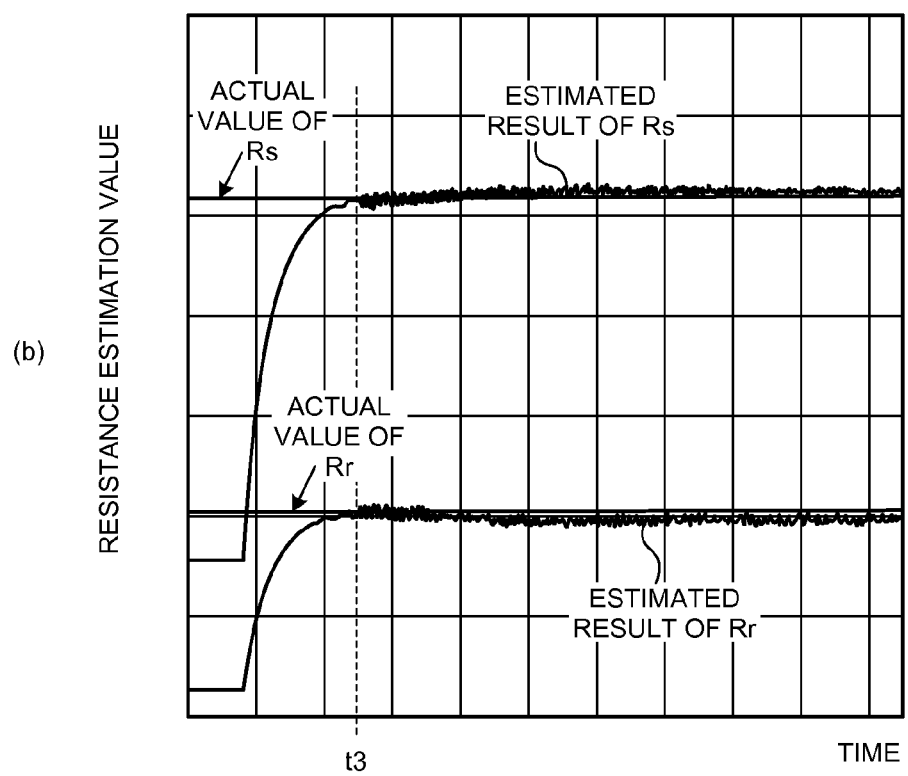
(b)

POWER CONVERSION APPARATUS OF ELECTRIC VEHICLE

FIELD

The present invention relates to a power conversion apparatus of an electric vehicle which can activate an alternating-current rotating machine without using a speed detector, and more particularly to a power conversion apparatus of an electric vehicle which measures a resistance value of an alternating-current rotating machine.

BACKGROUND

In recent years, speed-sensorless control has been commonly used for induction machines, and position-sensorless control has been commonly used for synchronous machines. For speed-sensorless control, it is important to grasp resistance values of an induction machine or synchronous machine. In particular, the resistance values of a motor (alternating-current rotating machine) vary with temperature. If errors occur between resistance values set by the control side and actual resistance values, desired output torque may fail to be obtained or the electric vehicle may fail to be activated.

As means for solving such a problem, for example, the following Patent Literature 1 describes a method for detecting the applied voltage and the input current to an induction machine for driving an electric vehicle, and estimating a primary resistance and a secondary resistance of the induction machine between when the electric vehicle is activated and when the speed of the electric vehicle is in a low speed range. The following Patent Literature 2 describes a method for temporarily applying a direct-current voltage or pulsating voltage to an induction machine for a certain period immediately after an operation command rises from zero, and estimating the primary resistance and secondary resistance of the induction machine.

CITATION LIST

Patent Literature

Patent Literature 1: Japanese Patent Application Laid-Open No. Hei. 4-8192 (pages 4 and 5)
Patent Literature 2: Japanese Patent Application Laid-Open No. Hei. 4-364384 (paragraphs [0008] and [0009])

SUMMARY

Technical Problem

While the foregoing Patent Literatures 1 and 2 describe the methods for measuring the resistances of a motor when the speed of an electric vehicle is in a low speed range, it is difficult to accurately estimate the primary resistance and secondary resistance of a motor under rotation. One of the reasons for the difficulty in estimating the primary resistance and secondary resistance of a motor under rotation is that the motor rotation gives a mutual inductance, a primary leakage inductance, and a secondary leakage inductance impedances, so that the values include impedances aside from the primary resistance and the secondary resistance. Another reason is that the presence of five or more unknown impedance elements makes it difficult to separate the impedances of the foregoing inductances and extract accurate values of the primary resistance and the secondary resistance.

The present invention has been achieved in view of the foregoing, and it is an object thereof to provide a power conversion apparatus of an electric vehicle which can accurately estimate a resistance value of an alternating-current rotating machine without using a rotation detector.

Solution to Problem

In order to solve the above problem and in order to attain the above object, a power conversion apparatus of an electric vehicle of the present invention, includes: a power converter for driving an alternating-current rotating machine; and a control unit for controlling the power converter based on an operation command. Additionally, the control unit includes a coordinate conversion unit for converting current information detected from the alternating-current rotating machine into orthogonal axis currents on orthogonal rotating coordinates, a speed determination unit for computing a voltage command for the power converter and determining that the speed of the alternating-current rotating machine is zero based on the operation command and the orthogonal axis currents, and a resistance computing unit for computing a resistance of the alternating-current rotating machine based on the orthogonal axis currents, the voltage command, and a power running command when the speed determination unit determines that the speed of the alternating-current rotating machine is zero and the operation command is changed from a brake command to the power running command.

Advantageous Effects of Invention

According to this invention, there is provided an effect that it is possible to accurately estimate a resistance value of an alternating-current rotating machine without using a rotation detector.

BRIEF DESCRIPTION OF DRAWINGS

FIG. 7 is a diagram showing a result of resistance value estimation by the power conversion apparatus according to the first embodiment of the present invention.

DESCRIPTION OF EMBODIMENTS

Hereinafter, embodiments of the power conversion apparatus according to the present invention will be described in detail with reference to the drawings. It should be noted that the present invention is not limited by these embodiments.
First Embodiment.

Figure 1:
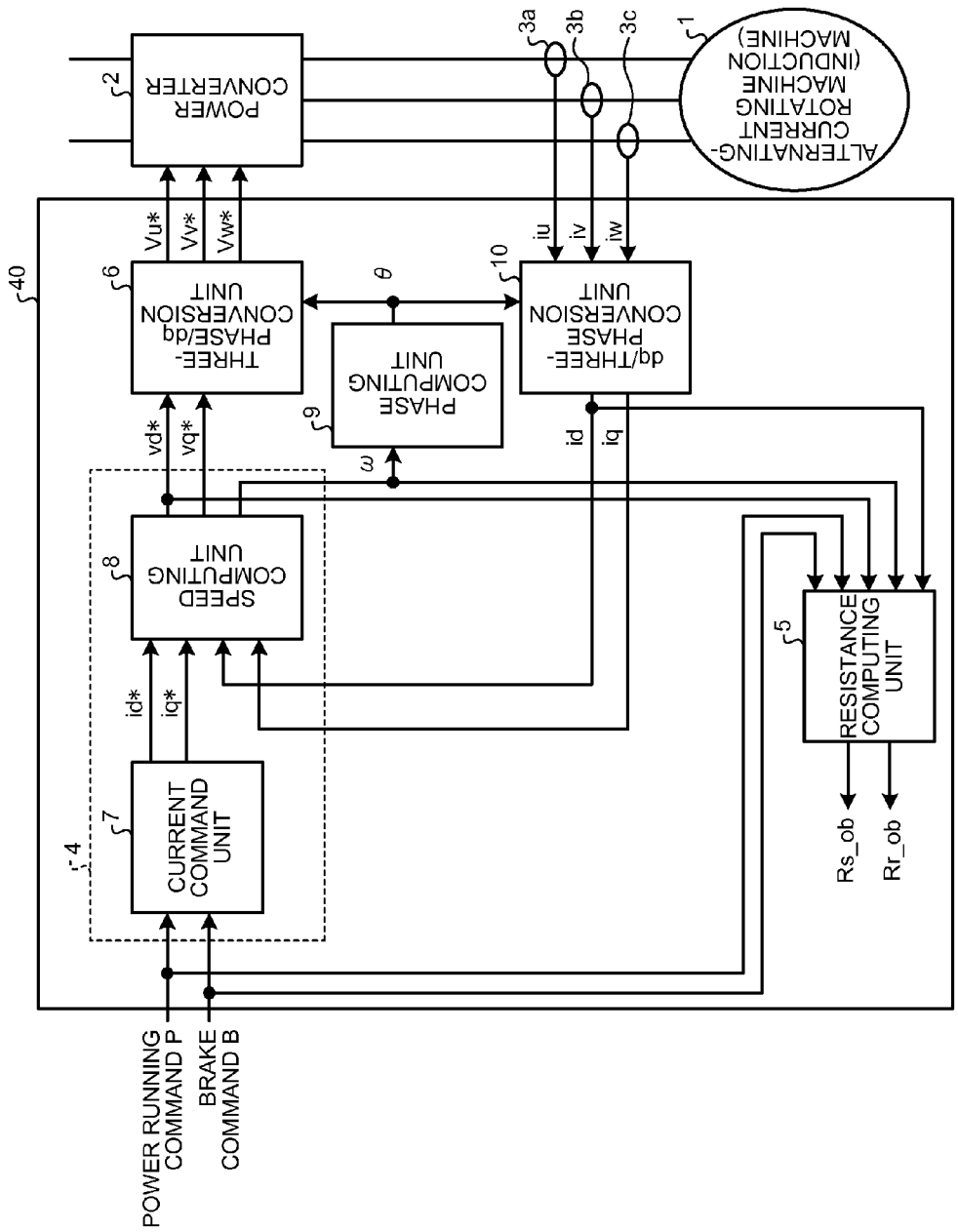
FIG. 1 is a block diagram of a power conversion apparatus according to a first embodiment of the present invention.
Figure 2:
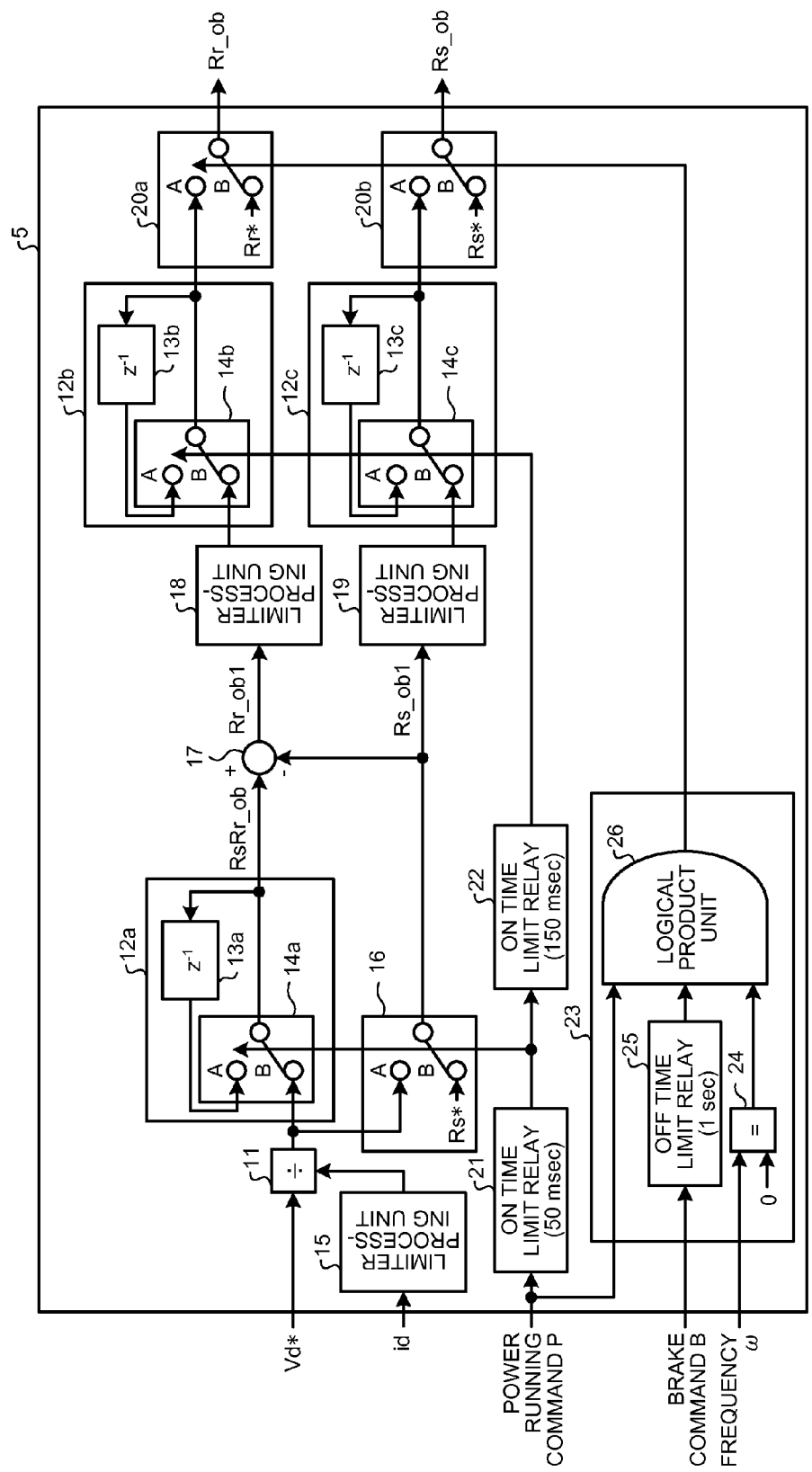
FIG. 2 is a diagram showing an example of the configuration of a resistance computing unit shown in FIG. 1.
Figure 3:
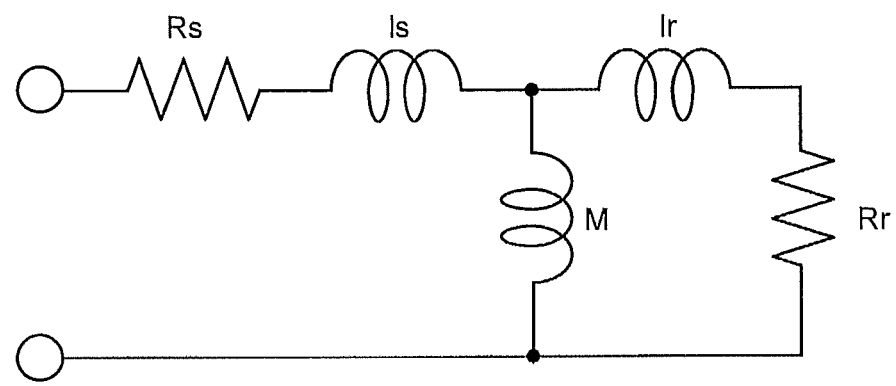
FIG. 3 is an equivalent circuit for one phase of an induction machine when a conventional technology is applied.
Figure 4:
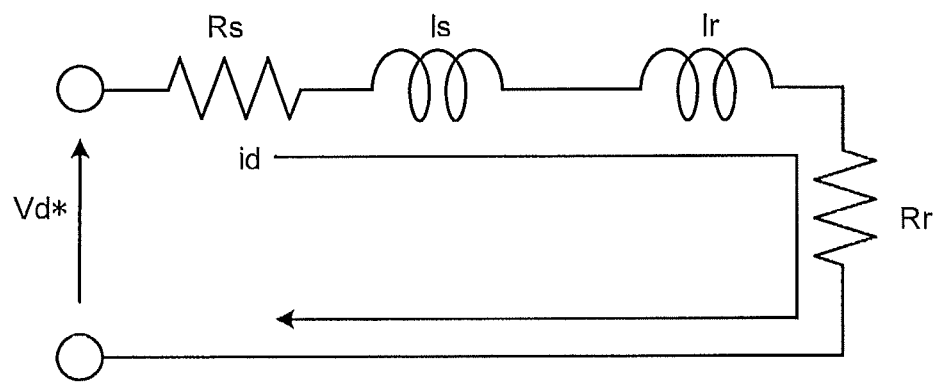
FIG. 4 is an equivalent circuit of an induction machine when the power conversion apparatus according to the first embodiment of the present invention is applied.
Figure 5:
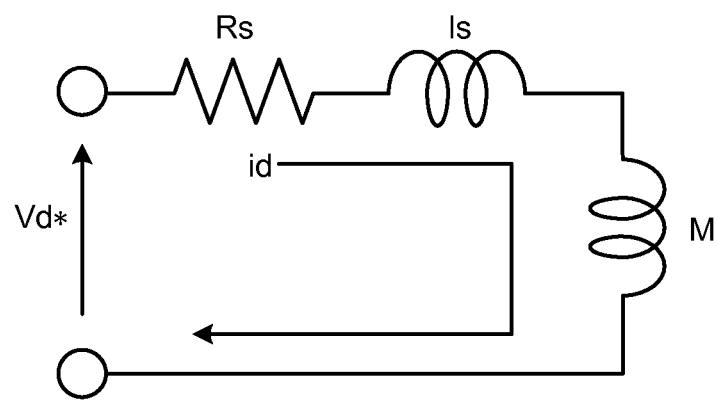
FIG. 5 is another equivalent circuit of the induction machine when the power conversion apparatus according to the first embodiment of the present invention is applied.

FIG. 1 is a block diagram of a power conversion apparatus according to the first embodiment of the present invention. FIG. 2 is a diagram showing an example of the configuration of a resistance computing unit shown in FIG. 1. FIG. 3 is an equivalent circuit for one phase of an induction machine when a conventional technology is applied. FIG. 4 is an equivalent circuit of an induction machine when the power conversion apparatus according to the first embodiment of the present invention is applied. FIG. 5 is another equivalent circuit of the induction machine when the power conversion apparatus according to the first embodiment of the present invention is applied.

In FIG. 1, the power conversion apparatus includes as its main components an induction machine 1 which is an alternating-current rotating machine, a power converter 2 which converts a direct-current voltage into a three-phase voltage and drives the induction machine 1, current detectors 3a, 3b, and 3c which are connected to the alternating-current side of the power converter 2 and detect phase currents iu, iv, and iw occurring in the induction machine 1, and a control unit 40. The control unit 40 includes a speed determination unit 4, a phase computing unit 9, a three-phase/dq conversion unit 6, and a dq/three-phase conversion unit 10 which converts the detected phase currents iu, iv, and iw into d- and q-axis current detection values id and iq. The speed determination unit 4 further includes a current command unit 7 and a speed computing unit 8 which is a first computing unit.

FIG. 1 shows the current detectors 3 that detect the currents flowing through the connections between the power converter 2 and the induction machine 1 by using CTs or the like. However, this is not restrictive, and the current detectors 3 may be configured to detect the phase currents by using other known techniques. Since the relationship iu+iv+iw=0 holds and it is possible to determine, for example, a w-phase current from detected currents of two phases u and v, one of the three current detectors may be omitted. As an example, the present embodiment deals with a case where the induction machine 1 is applied as an alternating-current rotating machine. It will be understood that the same effects are expected with a synchronous machine. Aside from alternating-current rotating machines, the present embodiment is also applicable, for example, to power conversion apparatuses that drive and control a linear induction motor, a linear synchronous motor, and electromagnetic actuators such as solenoids.

As is publicly known, a coordinate conversion of a three-phase voltage or three-phase current into two rotating orthogonal axes needs control coordinate axes. Based on a predetermined angular frequency ω, the phase of the control coordinate axes, or rotating two-axis coordinates, shall be θ. The phase θ is an integrated value of the predetermined angular frequency, determined by the phase computing unit 9 which is a second computing unit. The phase computing unit 9 integrates the predetermined angular frequency ω, and outputs the resultant as the phase θ to the three-phase/dq conversion unit 6 and the dq/three-phase conversion unit 10.

When the power conversion apparatus according to the present embodiment is applied to an electric train, an operator inputs a power running command P or a brake command B, which is an operation command from an operation stand, to the resistance computing unit 5, which is a third computing unit, and the current command unit 7.

The speed determination unit 4 is intended to detect the speed of the induction machine 1 which is an alternating-current rotating machine. In particular, the speed determination unit 4 is a function for detecting the initial speed of the induction machine 1 immediately after the power converter 2 at a halt is activated. Based on the power running command P or the brake command B, the current command unit 7 generates d- and q-axis current commands id* and iq*. The d-axis current command id* is supplied stepwise. The q-axis current command iq* is maintained at 0 so that the induction machine produces no torque.

The d- and q-axis current commands id* and iq* generated by the current command unit 7 are also input to the speed computing unit 8. The d- and q-axis current detection values id and iq from the dq/three-phase conversion unit 10 are also input into the speed computing unit 8. Based on the d-axis current command id*, the q-axis current command iq* (=0), and the d- and q-axis current detection values id and iq, the speed computing unit 8 computes d- and q-axis voltage commands Vd* and Vq* and computes the angular frequency ω, which is speed information, as shown in the equations (1) and (2):

[Eq. 1]
$$Vd^* = k_{cp}\left(1 + \frac{\omega_{cpi}}{s}\right)(id^* - id) \quad (1)$$

[Eq. 2]
$$Vq^* = k_{cp}\left(1 + \frac{\omega_{cpi}}{s}\right)(0 - iq) \quad (2)$$

With a current response target value $\omega_{cc}$ determined, the proportional gains Kpc and $\omega_{cpi}$ are given by the equation (3). It should be noted that the current response target value $\omega_{cc}$ is set to a value sufficiently higher than a maximum speed for restart. Here, Ls is the primary-side inductance of the induction machine 1, and there is a relationship Ls=M+ls.

[Eq. 3]
$$k_{cp} = \omega cc \times Ls \quad (3)$$
$$\omega_{cpi} = \frac{\omega cc}{10}$$

The speed computing unit 8 computes a flux amplitude based on a value that is determined by subtracting the amount of drop due to a d-axis resistance from the d-axis voltage on the rotating two axes (d- and q-axes) which rotate in synchronization with each frequency of the output voltage. The speed computing unit 8 divides the value of the q-axis voltage minus the amount of drop due to a q-axis resistance by the foregoing flux amplitude to compute the angular frequency ω of the alternating-current rotating machine in free rotation. Hereinafter, the computation of the angular frequency ω by the speed computing unit 8 will be concretely described. When the rotating two axes (d- and q-axes) are rotating at a predetermined angular frequency ω, the d-axis component φds and q-axis component φqs of the armature (primary) flux of the induction machine 1 can be expressed by the equations (4) and (5):

[Eq. 4]
$$\phi ds = \int (Vd* - Rs \cdot id + \omega \cdot \phi q) dt \quad (4)$$

[Eq. 5]
$$\phi qs = \int (Vq* - Rs \cdot iq - \omega \cdot \phi d) dt \quad (5)$$

Torque τm output from the induction machine 1 is proportional to the magnitude of the outer product of the armature flux and the armature current, and can be expressed by the equation (6). Pm is the number of pole pairs of the motor.

[Eq. 6]
$$\tau m = Pm \cdot (\phi ds \cdot iq - \phi qs \cdot id) \quad (6)$$

If the d-axis direction of the rotating two axes coincides with the direction of the armature flux, φqs=0. Then, substituting φqs=0 into the equations (4) and (5) yields the equations (7) and (8):

[Eq. 7]
$$\phi ds = \int (Vd^* - Rs \cdot id) dt \quad (7)$$

[Eq. 8]
$$\omega = \frac{(Vq^* - Rs \cdot iq)}{\phi ds} \quad (8)$$

In other words, if the rotating two axes (d- and q-axes) are rotated in synchronization with the angular frequency ω that is computed according to the equations (7) and (8), the d-axis direction of the rotating two axes coincides with the direction of the armature flux. The angular frequency ω computed by the equation (8) is input to the phase computing unit 9 to compute the phase θ. Then, the d-axis voltage command Vd* and the q-axis voltage command Vq* computed by the speed computing unit 8 are input to the three-phase/dq conversion unit 6 and converted into three-phase voltage commands Vu*, Vv*, and Vw*. The power converter 2 performs driving based on such three-phase voltage commands Vu*, Vv*, and Vw*.

(Resistance Computing Unit)

The resistance computing unit 5, which is the most important part of the present invention, will be described below. In FIG. 2, the resistance computing unit 5 computes a primary resistance estimation value Rs_ob and a secondary resistance estimation value Rr_ob with the power running command P, the brake command B, the d-axis voltage command Vd*, the d-axis current detection value id, and the angular frequency ω as input. To be more specific, the resistance computing unit 5 shown in FIG. 2 includes as its main components a division unit 11, latch units 12a, 12b, and 12c, a zero divide prevention limiter processing unit 15, a subtraction unit 17, a secondary resistance limiter processing unit 18, a primary resistance limiter processing unit 19, switch units 20a and 20b, an ON time limit relay unit (50 msec) 21, an ON time limit relay unit (150 msec) 22, and a stop sensing unit 23.

The latch unit 12a includes a previous value storage element unit 13a and a switch unit 14a. Similarly, the latch unit 12b (12c) includes a previous value storage element unit 13b (13c) and a switch unit 14b (14c). The stop sensing unit 23 includes an equal comparison unit 24, an OFF time limit relay unit (1 sec) 25, and a logical product unit 26.

The configuration and operation of the resistance computing unit 5 will be more concretely described below. The d-axis current detection value id is input to the zero divide prevention limiter processing unit 15. Since the d-axis current detection value id has a positive value, the following processing is performed. If id≤0, a small non-zero value is set. The maximum rated current value can be determined by the characteristics of the induction machine 1.

If id≤0, id=0.0001. If 0<id≤the maximum rated current value, id=id (simply output the id). If id >the maximum rated current value, id=the maximum rated current value.

The d-axis voltage command Vd* is input to the division unit 11. The division unit 11 divides the d-axis voltage command Vd* by the d-axis current detection value id that is passed the zero divide prevention limiter processing unit 15. The output from the division unit 11 is input to the switch unit 14a and the switch unit 16.

The power running command P is input to the ON time limit relay unit 21. The output signal of the ON time limit relay unit 21 is output as an ON command 50 msec after an ON command of the power running command P is input. The duration of 50 msec is immediately after the application of the voltage by the power converter 2 to the induction machine 1. The current id flowing through the induction machine 1 therefore takes the route of the equivalent circuit shown in FIG. 4, not the equivalent circuit shown in FIG. 3.

A concrete description thereof will be given below. FIG. 3 shows an equivalent circuit for one phase of an induction machine, showing a primary resistance Rs, a secondary resistance Rr, a mutual inductance M, a primary leakage inductance ls, and a secondary leakage inductance lr of this induction machine. The rotation of the induction machine gives these inductances M, ls, and lr impedances. The induction machine under rotation therefore includes not only the values of the primary resistance Rs and the secondary resistance Rr but also the impedances of the respective inductances M, ls, and lr. The foregoing is the same as described in the problem section above.

On the other hand, when the induction machine 1 is at a complete halt, no current flows through the mutual inductance M. The inductances ls and lr of FIG. 4 have no impedance, either. The power conversion apparatus according to the present embodiment is configured to estimate a primary resistance estimation value+a secondary resistance estimation value, RsRr_ob, by dividing the d-axis voltage command Vd* by the d-axis current detection value id in 50 msec since the ON command of the power running command P is input to the ON time limit relay unit 21.

Next, after a lapse of 50 msec from the submission of the power running command P, the ON time limit relay unit 21 outputs an output signal as an ON command, and the contacts of the switch units 14a and 16 are changed from B to A. As a result, the latch unit 12a retains RsRr_ob that is stored in the previous value storage element unit 13a. In other words, the latch unit 12a latches RsRr_ob immediately after the lapse of 50 msec.

It should be noted that the value of 50 msec needs to be sufficiently shorter than the secondary time constant of the induction machine, which is determined by (the mutual inductance M+the secondary leakage inductance lr)/the secondary resistance Rr. In the case of an electric train motor (for example, with a rated power of 100 kW to 600 kW), the secondary time constant of the motor is 300 to 500 msec or so. The ON time limit relay unit 21 is thus set to the value of 50 msec, one-tenth the secondary time constant. The closer to the secondary time constant, the less current flows through the secondary resistance Rs. The inventor has found that the value is preferably set to one-tenth the secondary time constant.

At the contact B (i.e., before the lapse of 50 msec), the switch unit 16 outputs a primary resistance design value Rs*. The primary resistance design value Rs* is the value of the primary resistance Rs with which the induction machine 1 is designed (for example, a value at 115° C. to 105 degrees).

At the contact A (i.e., after the lapse of 50 msec), the switch unit 16 outputs the value of the d-axis voltage command Vd* divided by the d-axis current detection value id, i.e., a primary resistance estimation value Rs_ob1. After 50 msec, the value of the d-axis voltage command Vd* divided by the d-axis current detection value id becomes Rs_ob1 for the following reason. As described above, the closer to the secondary time constant, the less current flows through the secondary resistance Rr. Since no current flows through the secondary resistance (not shown) of the equivalent circuit of the motor shown in FIG. 5, the current id flows through the route shown in FIG. 5. When the induction machine 1 is at a complete halt, the primary leakage inductance ls and the mutual inductance M shown in FIG. 5 have no impedance. The d-axis voltage command Vd* can thus be divided by the d-axis current detection value id to calculate the value of the primary resistance Rs, i.e., estimate the primary resistance estimation value Rs_ob1.

After the lapse of 50 msec, the subtraction unit 17 subtracts Rs_ob1 from the retained RsRr_ob to compute a secondary resistance estimation value Rr_ob1. In the meantime, Rs_ob1 from the switch unit 16 is input to the primary resistance limiter processing unit 19.

The primary resistance limiter processing unit 19 performs the following processing. According to the primary resistance limiter processing unit 19, it is possible to prevent the primary resistance estimation value Rs_ob1 from having a value smaller or greater than expected.

If Rs_ob1≤Rs*×0.5, Rs_ob1=Rs*×0.5. If Rs*×0.5<Rs_ob1≤Rs*×1.5, Rs_ob1=Rs_ob1 (simply output the Rs_ob1). If Rs_ob1>Rs*×1.5, Rs_ob1=Rs*×1.5. Here, the primary resistance design value Rs* is the primary resistance value with which the induction machine 1 is designed.

The output value of the primary resistance limiter processing unit 19 is output to the latch unit 12c. Rr_ob1 from the subtraction unit 17 is input to the secondary resistance limiter processing unit 18. The secondary resistance limiter processing unit 18 performs the following processing. According to the secondary resistance limiter processing unit 18, it is possible to prevent Rr_ob1 from having a value smaller or greater than expected.

If Rr_ob1≤Rr*×0.5, Rr_ob1=Rr*×0.5. If Rr*×0.5<Rr_ob1≤Rr*×1.5, Rr_ob1=Rr_ob1 (simply output the Rr_ob1). If Rr_ob1>Rr*×1.5, Rr_ob1=Rr*×1.5. Incidentally, the primary resistance design value Rs* is the primary resistance value with which the induction machine 1 is designed.

The output value of the secondary resistance limiter processing unit 18 is output to the latch unit 12b. The contacts of the switch units 14a and 14b are changed from B to A when the output of the ON time limit relay unit 22 is turned ON. The time when the output of the ON time limit relay unit 22 is turned ON refers to 200 msec after the input of the ON signal of the power running command P, and at which the operation of the speed determination unit 4, the function of detecting the initial speed of the induction machine 1, is completed.

Since the contact of the switch unit 14b is changed from B to A, the latch unit 12b retains Rr_ob1 that is stored in the previous value storage element unit 13b. The output of the latch unit 12b is input to the switch unit 20a. The latch unit 12c retains Rs_ob1 that is stored in the previous value storage element unit 13c. The output of the latch unit 12c is input to the switch unit 20b.

Hereinafter, the configuration and operation of the stop sensing unit 23 which accepts input of the power running command P, the brake command B, and the angular frequency ω, will be described. In the present invention, as described above, the value of the primary resistance Rs and the value of the secondary resistance Rr are estimated on the condition that the inductances M, ls, and lr include no impedance, i.e., the induction machine 1 is not rotating. It is therefore needed to sense that the induction machine 1 is at a complete halt (not rotating). The stop sensing unit 23 is a function for determining whether or not the induction machine 1 is at a complete halt.

The conditions for the complete halt of the induction machine 1 are as follows:
(1) the angular frequency ω is zero (which is detected by the equal comparison unit 24), and (2) the power running command P is turned ON within 1 sec after the brake command B is turned OFF (which is detected by the OFF time limit relay unit 25 and the logical product unit 26). The logical product unit 26 outputs an ON signal when the conditions (1) and (2) are satisfied. It should be noted that the logical product unit 26 outputs an OFF signal if such conditions are not satisfied, for example, when the angular frequency ω is not zero, when the power running command P is not turned ON within 1 sec after the brake command B is turned OFF, or when 1 sec has elapsed after the brake command B is turned OFF.

The foregoing condition (2) means that when an electric vehicle is at a halt, the power converter 2 is not in operation and the wheels of the electric vehicle are fixed by a mechanical brake (which may be referred to as an air brake). If the brake command B is changed from ON to OFF in such a state, the fixing of the wheels by the mechanical brake is released. Since a mechanical operation is involved, all the braking force is not released immediately. That is, the force is released at the operation speed of the mechanical brake. The wheels of the electric vehicle are kept fixed while mechanical braking still remains. The inventor has found that if the power running command P is submitted to operate the power converter 2 under such a condition, the speed determination unit 4 detects the initial speed (angular frequency ω) of the induction machine 1, and this angular frequency ω is zero, then the induction machine 1 may be considered to be at a complete halt.

When the output of the stop sensing unit 23 is turned ON (or 1), the contacts of the switch units 20a and 20b are changed from B to A. Rs_ob1 and Rr_ob1 are reflected, and the primary resistance estimation value Rs_ob and the secondary resistance estimation value Rr_ob are output to outside. Rs_ob and Rr_ob are used as set values in vector control for torque control.

Figure 6:
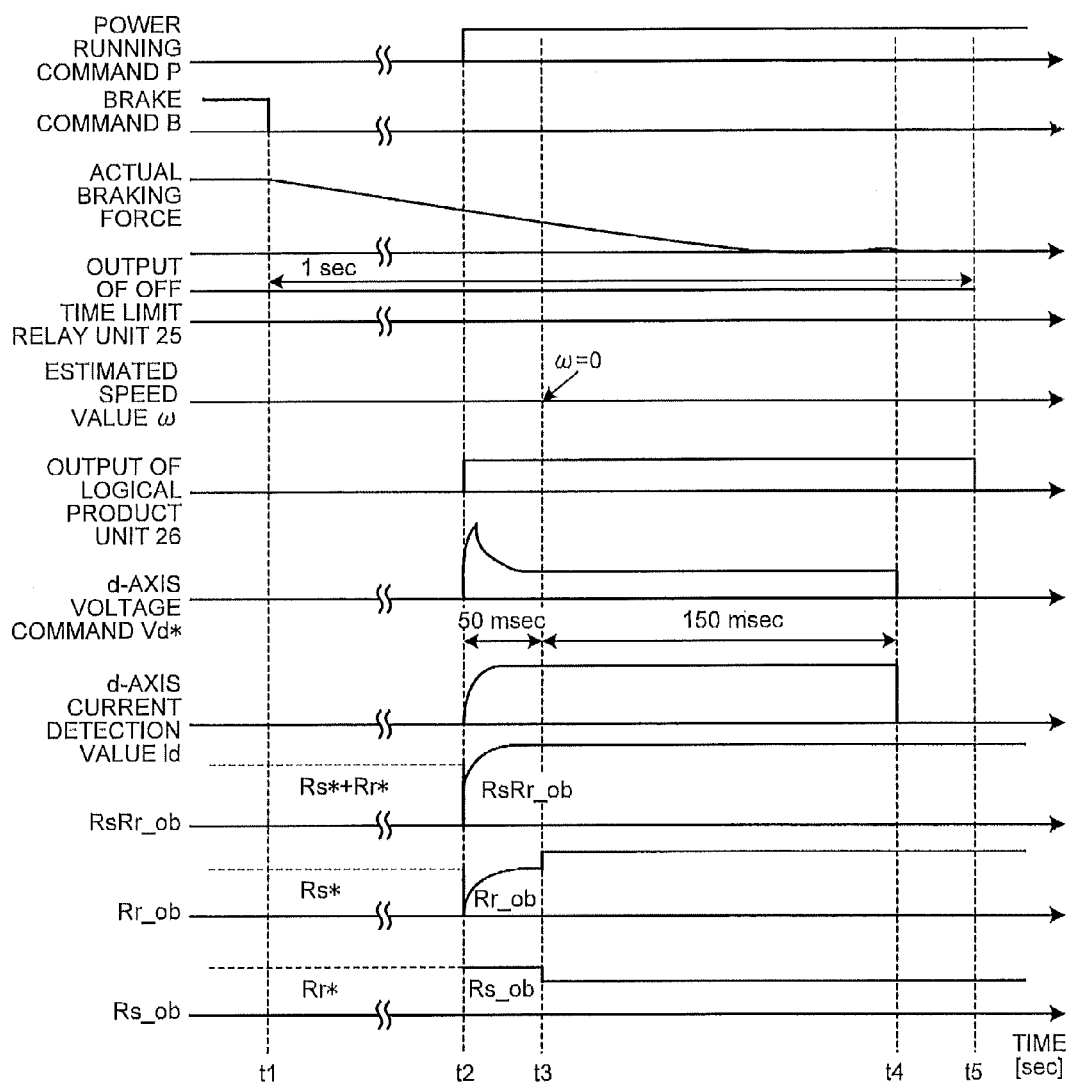
FIG. 6 is a diagram for explaining the operation of the power conversion apparatus according to the first embodiment of the present invention.
Figure 8:
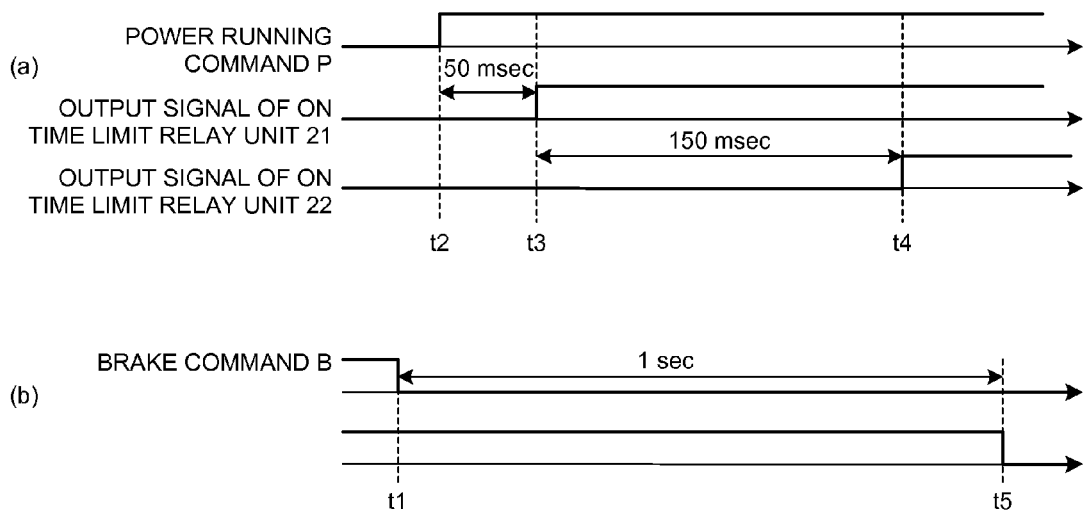
FIG. 8 is a diagram showing a relationship between a power running command, a brake command, and ON time limit relay units.

FIG. 6 is a diagram for explaining the operation of the power conversion apparatus according to the first embodiment of the present invention. FIG. 7 is a diagram showing the result of resistance value estimation by the power conversion apparatus according to the first embodiment of the present invention. FIG. 8 is a diagram showing the relationship between the power running command, brake command, and respective ON time limit relay units. FIG. 8(a) shows the relationship between the power running command P, the ON time limit relay unit 21, and the ON time limit relay unit 22. FIG. 8(b) shows the relationship between the brake command B and the OFF time limit relay unit 25.

In FIG. 6, time t1 is timing at which the brake command B changes from ON to OFF. FIG. 6 shows a state where actual braking force remains even after the brake command B is turned OFF at time t1. Time t2 is timing at which the power running command P is input to turn the output of the stop sensing unit 23 ON. Time t3 is a time 50 msec after time t2. Time t4 is a time 150 msec after time t3. The estimation of the resistance values is completed in time t4. Time t5 is timing at which the time set in the OFF time limit relay unit 25 (1 sec) elapses, which is 1 sec after the timing at which the brake command B is turned OFF (t1).

Between times t1 to t2, the power converter 2 is in a stopped state and thus ω=0. After time t2, mechanical braking remains as described above, and thus ω=0 even if the power running command P is submitted.

Between times t1 to t2, the contacts of the switch units 16, 20a, and 20b are B. The outputs of the resistance computing unit 5 are therefore the primary resistance design value Rs* and the secondary resistance design value Rr*.

Between times t2 to t3, the foregoing conditions (1) and (2) are satisfied. The division unit 11 thus starts to compute RsRr_ob. At time t2, the contact of the switch unit 16 is B, so that the primary resistance design value Rs* is output through the contact A of the switch unit 20b.

Between times t3 to t4, the contact of the switch unit 16 changes to A. The switch unit 16 therefore outputs Rs_ob1, and the subtraction unit 17 outputs Rr_ob1.

Between t4 to t5, the contacts of the switch units 14b and 14c change to A. Rs_ob and Rr_ob are therefore retained and output to outside through the contacts A of the switch units 20a and 20b.

After time t5, the contacts of the switch units 20a and 20b change to B, so that the primary resistance design value Rs* and the secondary resistance design value Rr* are output again.

FIG. 7 shows the result of a simulation that confirms the accuracy of resistance estimation of the present invention by using constants of an electric train induction motor (with a rated capacity of 180 kW). By this simulation, it can be confirmed that the primary and secondary resistance estimation values almost coincide with the true values of the motor (the values of the actual motor). In the Rs+Rr estimation period of FIG. 7(a), the estimated state of RsRr_ob and the estimated state of Rs_ob are shown. In the Rs/Rr individual estimation period of FIG. 7(a), Rr_ob determined by the subtraction unit 17 is shown. FIG. 7(b) enlarges the result of estimation of Rs_ob and Rr_ob in the individual estimation period (t3 and later).

Figure 9:
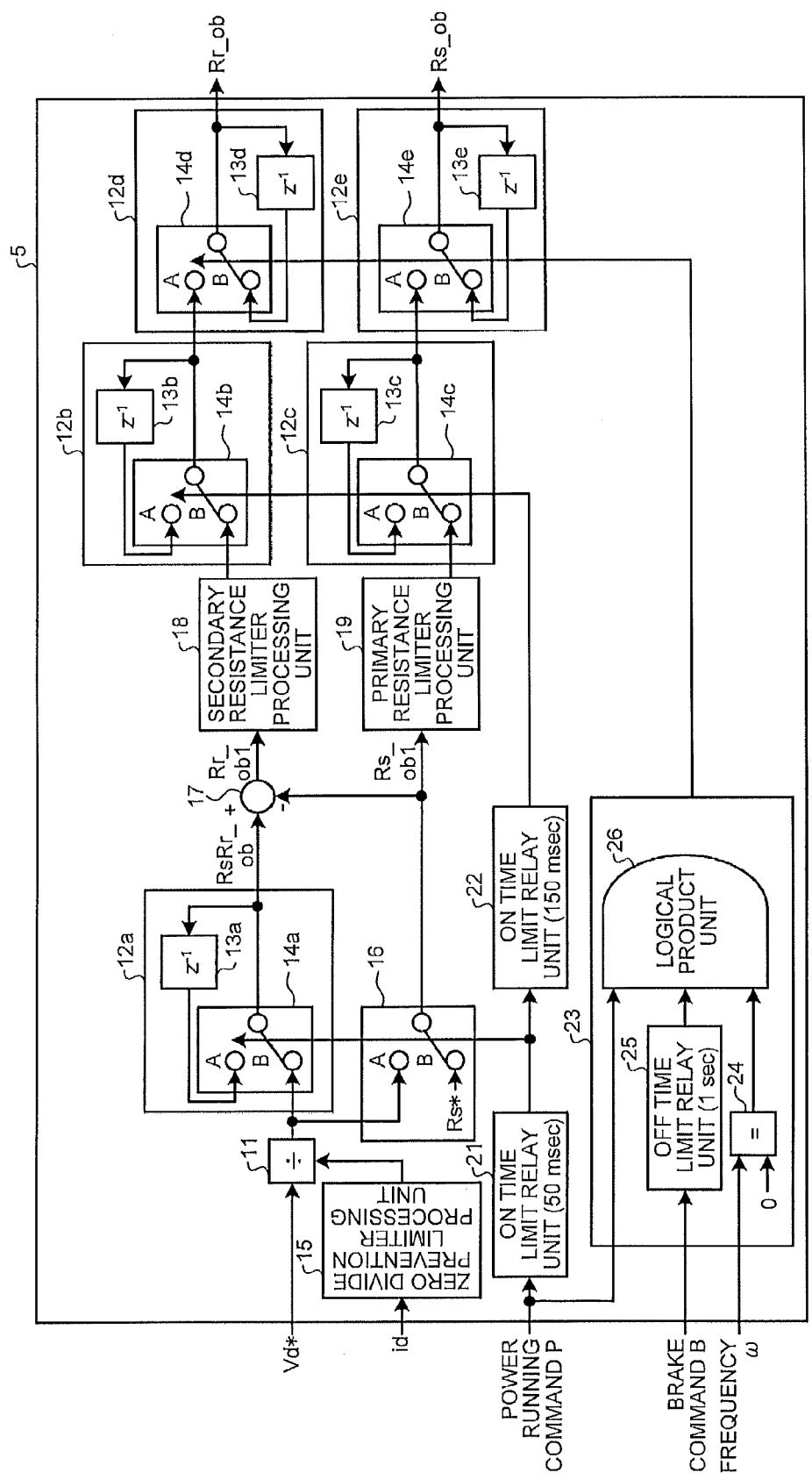
FIG. 9 is a diagram showing another example of the configuration of the resistance computing unit shown in FIG. 1.

FIG. 9 is a diagram showing another example of the configuration of the resistance computing unit shown in FIG. 1. The resistance computing unit 5 shown in FIG. 9 includes latch units 12d and 12e instead of the switch units 20a and 20b of FIG. 2. The use of the latch units 12d and 12e makes it possible to reflect computed estimation results sequentially, so that the induction machine 1 can be continuously monitored for temperature etc. A description thereof will be given. After the estimation of Rs_ob and Rr_ob, the contacts of the switch units 14d and 14e change to B to output the resistances retained in the previous value storage element units 13d and 13e. Subsequently, for example, when the electric vehicle that has started running comes to a halt again, the foregoing operation of t1 to t4 can be performed to obtain a new primary resistance estimation value Rs_ob and a new secondary resistance estimation value Rr_ob.

As has been described above, the power conversion apparatus according to the present embodiment determines that the speed of the alternating-current rotating machine is zero based on the brake command B, the power running command P, the d-axis voltage command Vd*, and the d-axis current detection value id. When the speed of the alternating-current rotating machine is zero and the brake command B is changed to the power running command P in predetermined time, the power conversion apparatus computes the resistance values of the alternating-current rotating machine based on the d-axis voltage command Vd* and the d-axis current detection value id. This enables accurate estimation of the resistance values of the alternating-current rotating machine. According to a conventional technology, it has been difficult to obtain accurate resistance values because of the inductance components that occur from the rotation of the alternating-current rotating machine under speed-sensorless control. According to the power conversion apparatus of the present embodiment, the primary resistance estimation value Rs_ob and the secondary resistance estimation value Rr_ob are estimated after the power running command P is input and before the alternating-current rotating machine rotates, i.e., when the d-axis voltage command Vd* and the d-axis current detection value id are obtained and the angular frequency ω is zero. Such a mode makes it possible to obtain resistance values more accurate than the conventional technology. Consequently, the resulting resistance values can be used as set values in vector control, thereby ensuring stable desired torque output. The temperature of the alternating-current rotating machine can also be estimated from the estimated resistance values. In particular, the application to the induction machine 1, which is an alternating-current rotating machine, makes it possible to estimate the value of the primary resistance Rs and the value of the secondary resistance Rr.

Second Embodiment.

Figure 10:
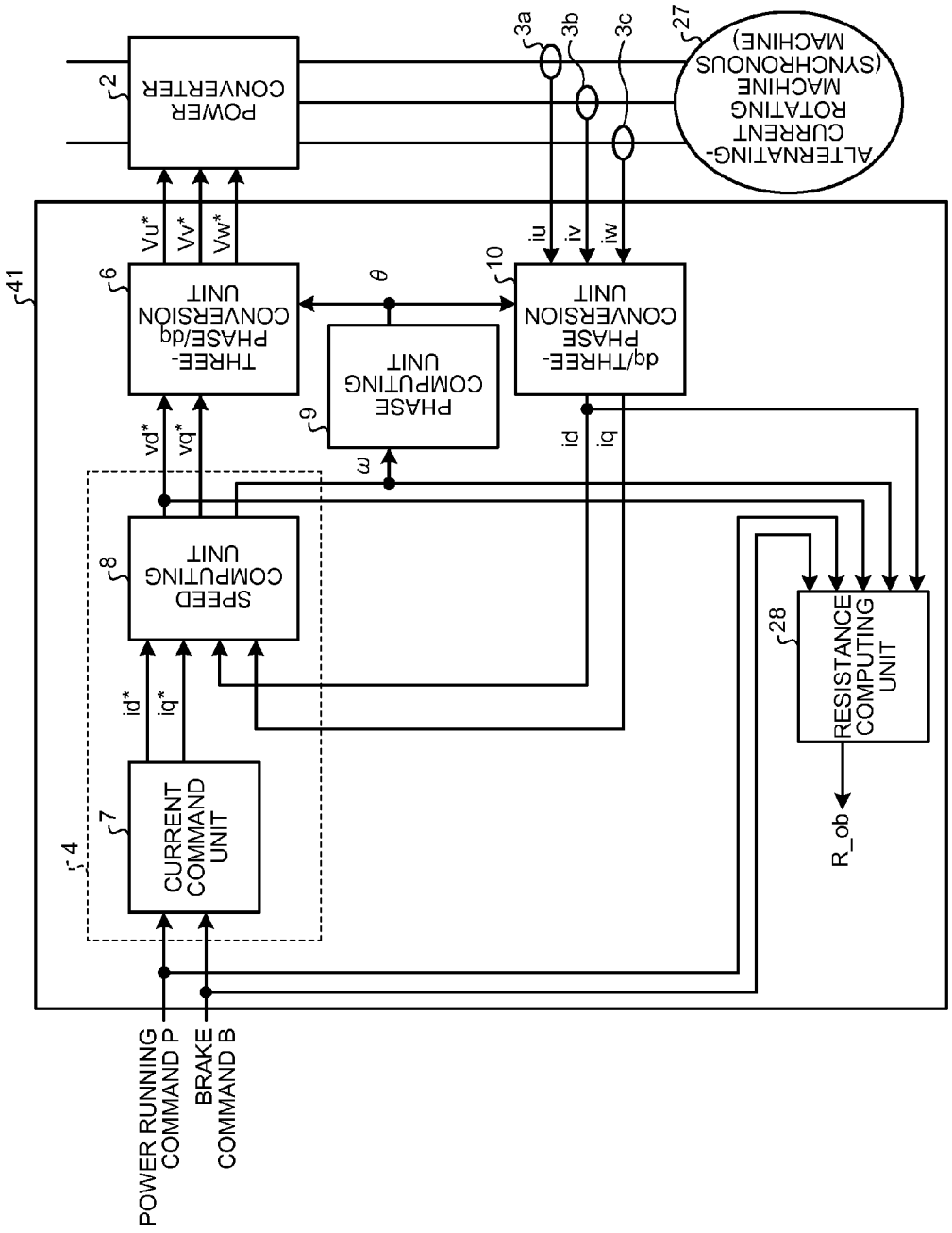
FIG. 10 is a block diagram showing a power conversion apparatus according to a second embodiment of the present invention.
Figure 11:
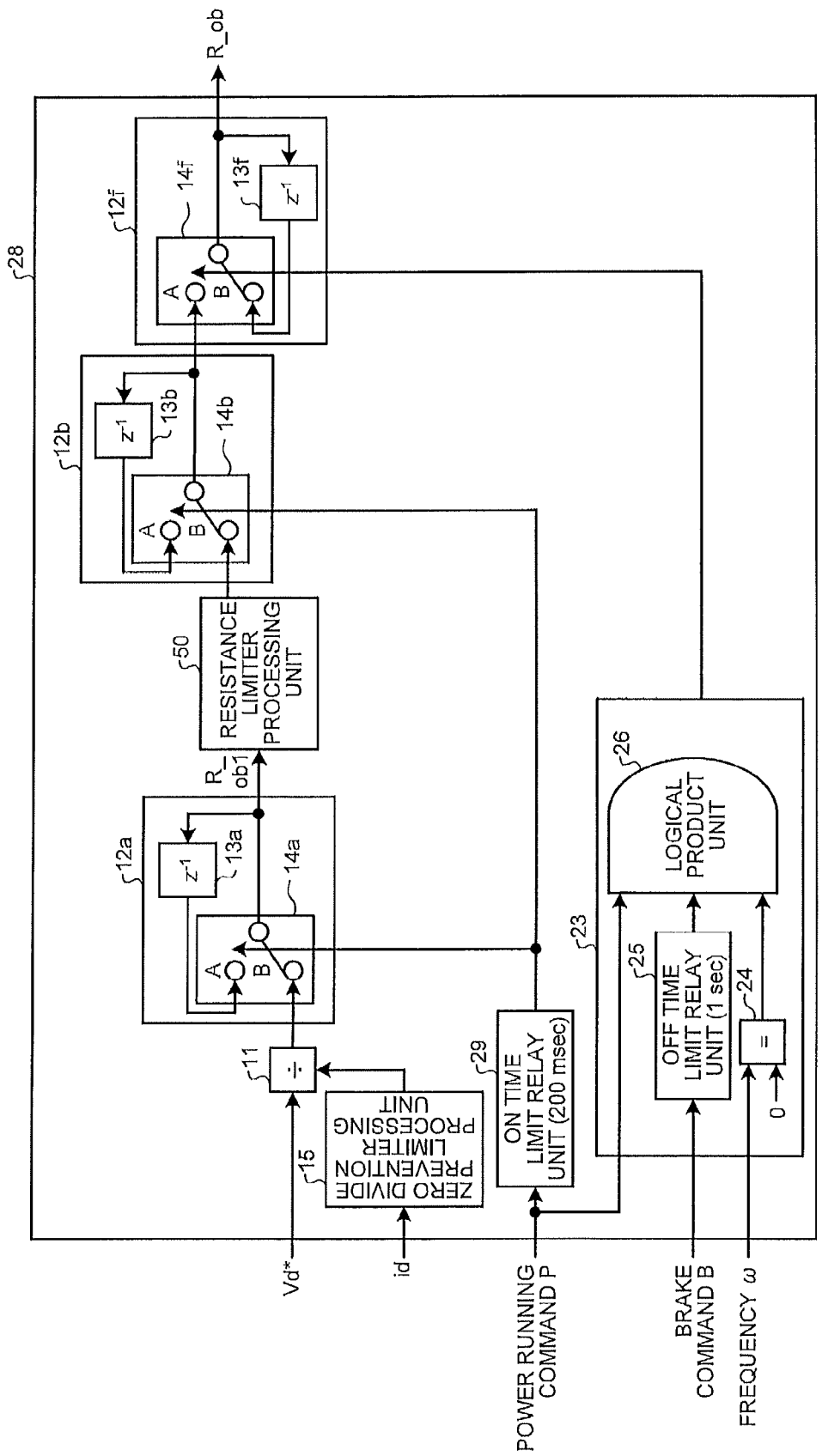
FIG. 11 is a block diagram of the resistance computing unit shown in FIG. 10.
Figure 12:
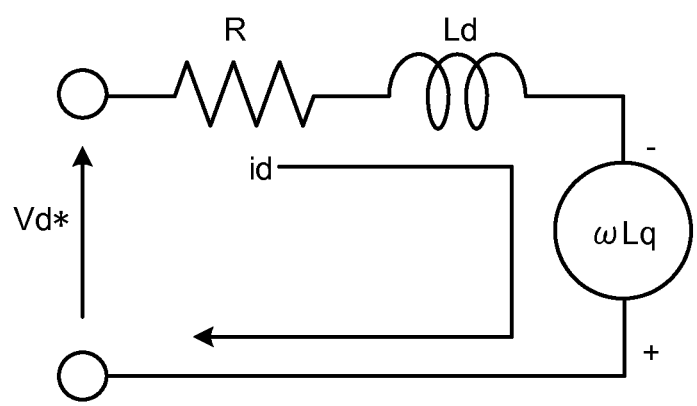
FIG. 12 is an equivalent circuit of a synchronous machine when the power conversion apparatus according to the second embodiment of the present invention is applied.

FIG. 10 is a block diagram showing a power conversion apparatus according to embodiment 2 of the present invention. FIG. 11 is a block diagram of the resistance computing unit shown in FIG. 10. FIG. 12 is an equivalent circuit of a synchronous machine when the power conversion apparatus according to embodiment 2 of the present invention is applied. In FIG. 10, a difference from the first embodiment lies in that the alternating-current rotating machine is a synchronous machine 27 and thus a control unit 41 includes a resistance computing unit 28. Hereinafter, the same parts as in the first embodiment will be designated by like reference signs, and a description thereof will be omitted. The following description will only deal with differences.

In FIG. 12, when the synchronous machine 27 is at a complete halt and no current flows through the q-axis side of the synchronous machine 27 (i.e., iq=0), the d-axis inductance Ld and the q-axis inductance ωLq shown in FIG. 12 have no impedance. Then, it is possible to estimate the value of the resistance R from the d-axis voltage command Vd* and the d-axis current detection value id. This is implemented by the resistance computing unit 28 shown in FIG. 11. Although most of the functions of the resistance computing unit 28 are the same as in the first embodiment, the resistance computing unit 28 estimates the resistance R between the submission of the power running command P and a lapse of 200 msec. More specifically, at the contact B (i.e., before the lapse of 200 msec), the switch unit 14a estimates the value of the d-axis voltage command Vd* divided by the d-axis current detection value id, i.e., a resistance estimation value R_ob1. After the lapse of 200 msec, R_ob1 retained is input to a resistance limiter processing unit 50. In the latch unit 12b, the contact of the switch unit 14b is changed from B to A, whereby R_ob1 is retained and input to a latch unit 12f. In the latch unit 12f, the contact of a switch unit 14f is changed from B to A, whereby R_ob1 that is stored in a previous value storage element unit 13f is retained and R_ob is output to outside.

That is, unlike the first embodiment, there is none of the modes for estimating the primary resistance Rs +the secondary resistance Rr, estimating the primary resistance Rs, and estimating the secondary resistance Rr. In the present embodiment, the ON time limit relay unit 29 is set to 200 msec as an example. However, the absence of the modes makes it possible to set a smaller value.

As has been described above, the power conversion apparatus according to the present embodiment, like the first embodiment, can obtain a resistance value more accurate than the conventional technology. The resulting resistance value can be used as a set value in vector control to ensure stable desired torque output. The temperature of the alternating-current rotating machine can also be estimated from the estimated resistance value. In particular, according to the present embodiment, it is possible to estimate the value of the resistance R of the synchronous machine 27.

Third Embodiment.

Figure 13:
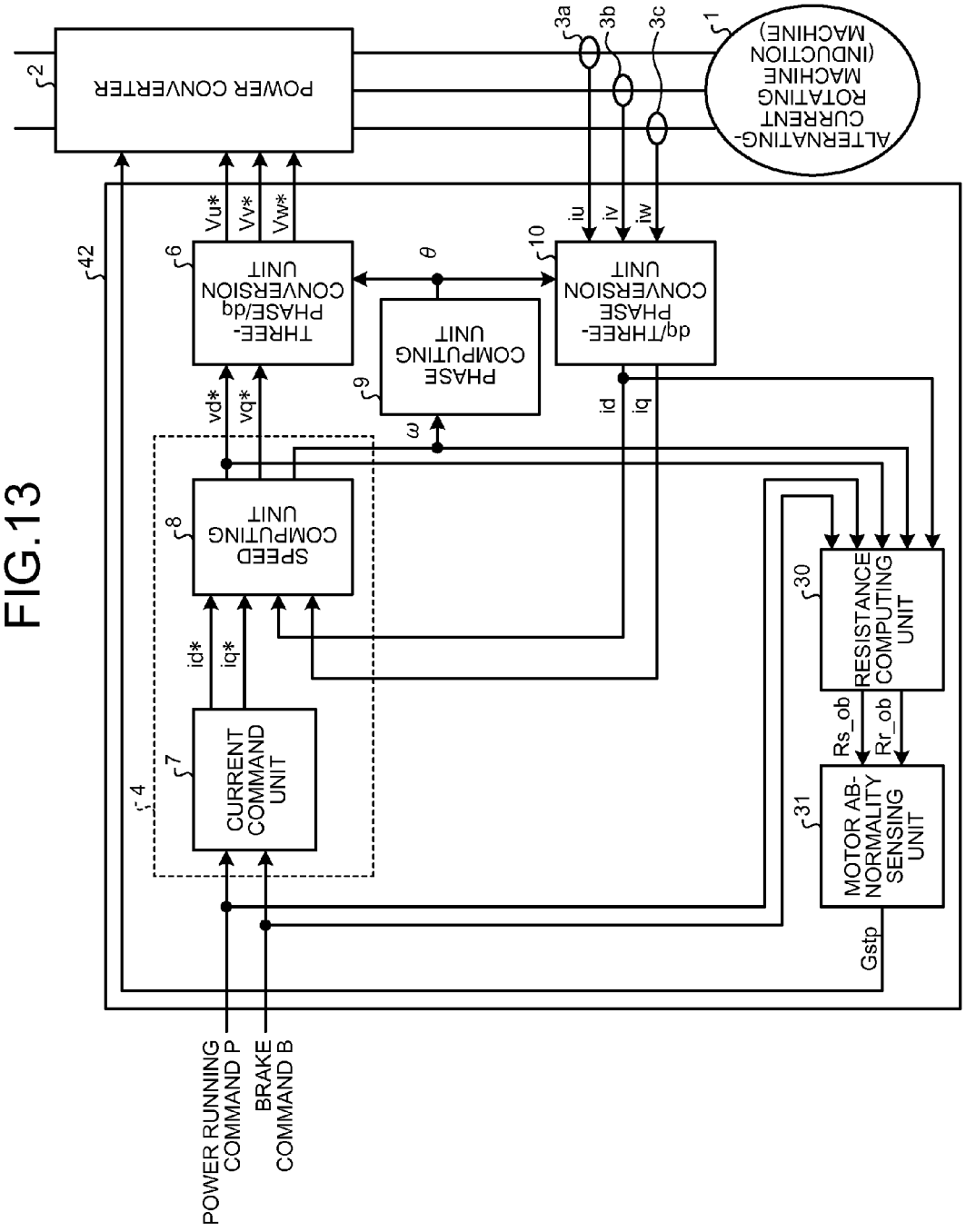
FIG. 13 is a block diagram of a power conversion apparatus according to a third embodiment of the present invention.
Figure 14:
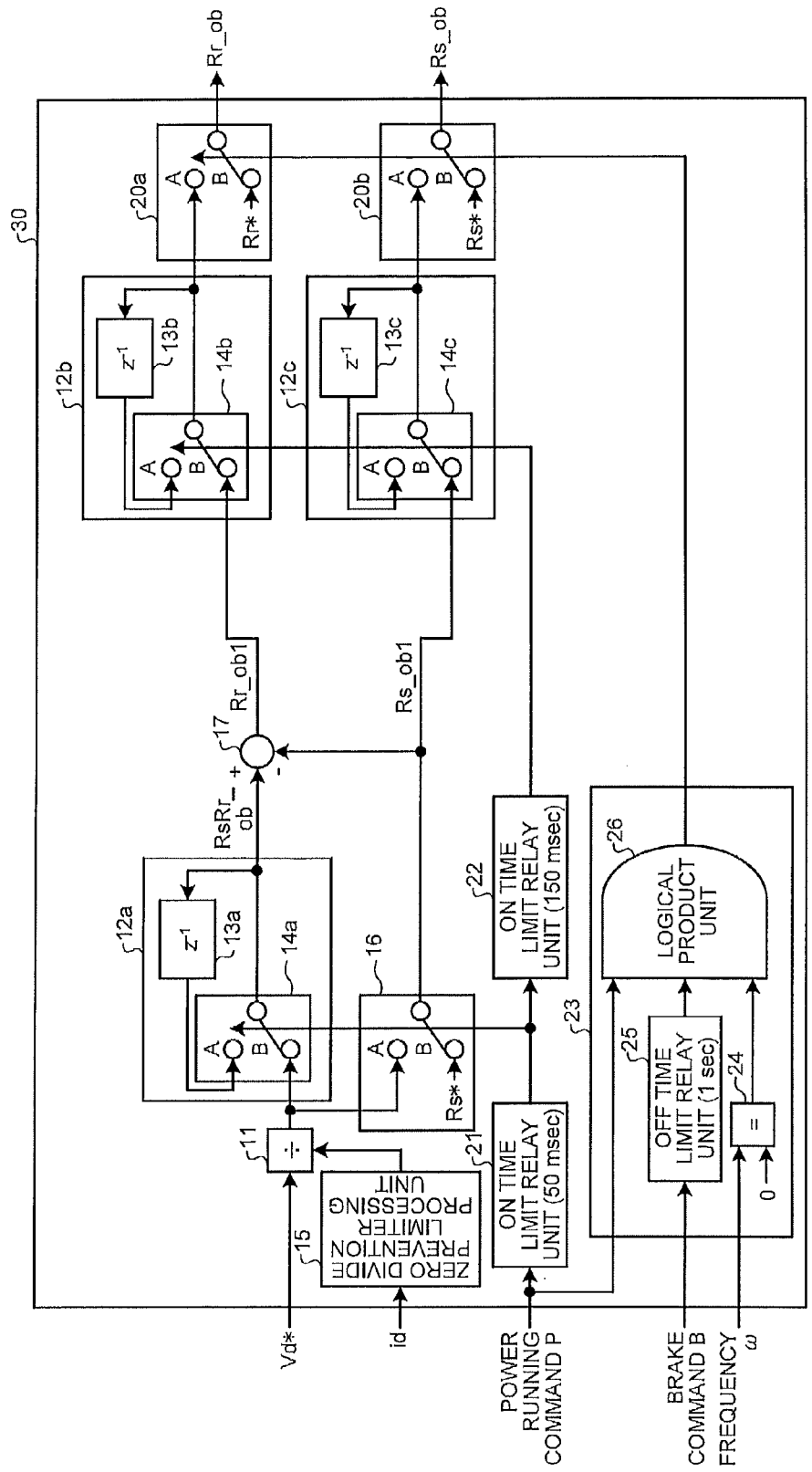
FIG. 14 is a block diagram of the resistance computing unit shown in FIG. 13.
Figure 15:
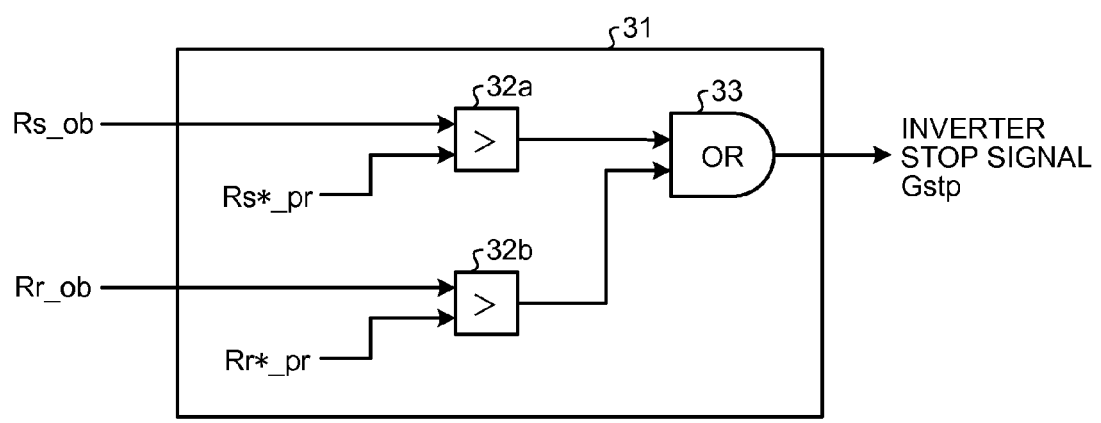
FIG. 15 is a block diagram of the motor abnormality sensing unit shown in FIG. 13.

FIG. 13 is a block diagram of a power conversion apparatus according to a third embodiment of the present invention. FIG. 14 is a block diagram of the resistance computing unit shown in FIG. 13. FIG. 15 is a block diagram of the motor abnormality sensing unit shown in FIG. 13. In FIG. 13, a difference from the first embodiment lies in that a control unit 42 includes a resistance computing unit 30 and a motor abnormality sensing unit 31 which is a new component. The power conversion apparatus according to the present embodiment estimates the value of the primary resistance Rs and the value of the secondary resistance Rr of the induction machine 1, and uses the estimated values to sense an abnormality of the induction machine 1. The same parts as in the first embodiment will be designated by like reference signs, and a description thereof will be omitted. The following description will only deal with differences.

An object of the power conversion apparatus according to the present embodiment is to avoid a failure of the induction machine 1 by using the value of the primary resistance Rs and the value of the secondary resistance Rr estimated. A description thereof will be given. For example, an electric train alternating-current rotating machine is equipped with a cooling blower in order to suppress heat generation from the rotor and stator of the motor. If the intake port of the blower is clogged, insufficient cooling can increase the rotor and stator of the motor in temperature, possibly causing a dielectric breakdown of the rotor and a failure of the motor fail. Then, in the power conversion apparatus according to the present embodiment, the resistance computing unit 30 estimates an abnormal temperature increase resulting from such a phenomenon. The value of the primary resistance Rs and the value of the secondary resistance Rr estimated are used to sense an abnormality of the motor, and a signal for stopping the inverter operation is output to prevent a failure of the induction machine 1. The present embodiment utilizes that the value of the secondary resistance Rr on the rotor side of the motor increases with the increasing temperature of the rotor of the motor.

In FIG. 14, the resistance computing unit 30 is almost the same as that of the first embodiment, but is characterized in that there is neither of the limiter processing units 18 and 19 shown in FIG. 2. The presence of the limiter processing units 18 and 19 prevents the estimated resistance values from becoming greater than a predetermined value when the foregoing phenomenon occurs. The limiter processing units 18 and 19 are then eliminated in order to acquire abnormally high values of the primary resistance Rs and the secondary resistance Rr.

In FIG. 15, the motor abnormality sensing unit 31 is configured to accept input of Rs_ob and Rr_ob computed by the resistance computing unit 30 and sense abnormal over-temperature of the motor. The configuration and operation of the motor abnormality sensing unit 31 will be described below. The motor abnormality sensing unit 31 includes as its main components a comparator 32a, a comparator 32b, and a logical sum unit 33. The comparator 32a compares the value of the primary resistance Rs with Rs*_pr. The comparator 32b compares the value of the secondary resistance Rr with Rr*_pr. Rs*_pr and Rr*_pr are values that are set on the assumption of a temperature lower than, for example, that at which the rotor causes a dielectric breakdown when the rotor or stator of the motor rises in temperature. For example, the maximum allowable temperature is determined by the insulation types of the materials of the rotor and stator of the motor. Rs*_pr and Rr*_pr may be set to resistance values corresponding to the maximum allowable temperature. For example, if the insulation type is H, the maximum allowable temperature is 180 degrees. Rs*_pr and Rr*_pr are set to resistance values corresponding to 180 degrees. The comparator 32a compares the primary resistance estimation value Rs_ob with Rs*_pr, and if the primary resistance estimation value Rs_ob greater than Rs*_pr, outputs 1 to the logical sum unit (OR) 33. Similarly, the comparator 32b compares secondary resistance estimation value Rr_ob with Rr*_pr, and if the secondary resistance estimation value Rr_ob is greater than Rr*_pr, outputs 1 to the logical sum unit (OR) 33.

If either one of the outputs of the comparator 32a and the comparator 32b is 1, the logical sum unit 33 outputs an inverter stop signal Gstp which indicates of stopping the inverter. In response to the Gstp, the power converter 2 stops its operation.

As has been described above, the power conversion apparatus according to the present embodiment, like the first embodiment, can provide resistance values more accurate than the conventional technology. Consequently, for example, even if a phenomenon occurs such that the rotor or stator of an alternating-current rotating machine increases in temperature to cause a dielectric breakdown of the rotor, it is possible to precisely detect the presence or absence of an abnormality by using accurate resistance values. This makes it possible to prevent the occurrence of a failure of the alternating-current rotating machine.

Industrial Applicability

As described above, the present invention is applicable to a power conversion apparatus of an electric vehicle which can activate an alternating-current rotating machine without using a speed detector, and is useful as an invention capable of accurately measuring a resistance value of an alternating-current rotating machine.

REFERENCE SIGNS LIST 1 induction machine
2 power converter
3a, 3b, 3c current detector
4 speed determination unit
5, 28, 30, 31 resistance computing unit
6 three-phase/dq conversion unit 7 current command unit
8 speed computing unit
9 phase computing unit
10 dq/three-phase conversion unit
11 division unit
12a, 12b, 12c, 12d, 12f latch unit
13a, 13b, 13c, 13f previous value storage element unit
14a, 14b, 14c, 14f, 16, 20a, 20b switch unit
15 zero divide prevention limiter processing unit
17 subtraction unit
18 secondary resistance limiter processing unit
19 primary resistance limiter processing unit
21, 22, 29 ON time limit relay unit
23 stop sensing unit
24 equal comparison unit
25 OFF time limit relay unit
26 logical product unit
27 synchronous machine
31 motor abnormality sensing unit
32a, 32b comparator
33 logical sum unit
40, 41, 42 control unit
50 resistance limiter processing unit
B brake command
Gstp inverter stop signal
id d-axis current detection value
iq q-axis current detection value
id* d-axis current command
iq* q-axis current command
iu, iv, iw phase current information
Ld d-axis inductance
lr secondary leakage inductance
ls primary leakage inductance
M mutual inductance
P power running command
R resistance
Rr secondary resistance
Rs primary resistance
R_ob resistance estimation value
Rr_ob, Rr_ob1 secondary resistance estimation value
Rs_ob, Rs_ob1 primary resistance estimation value
Rr* secondary resistance design value
Rs* primary resistance design value
RsRr_ob the primary resistance estimation value+the secondary resistance estimation value
Vd* d-axis voltage command
Vq* q-axis voltage command
Vu*, Vv*, Vw* three-phase voltage command
θ phase
τm torque
ω angular frequency
ωLq q-axis inductance

The invention claimed is:

1. A power conversion apparatus of an electric vehicle, comprising:
  a power converter for driving an alternating-current rotating machine; and
  a control unit for controlling the power converter based on an operation command, the control unit including
  a coordinate conversion unit for converting current information detected from the alternating-current rotating machine into orthogonal axis currents on orthogonal rotating coordinates,
  a speed determination unit for computing a voltage command for the power converter and determining speed of the alternating-current rotating machine based on the operation command and the orthogonal axis currents, and
  a resistance computing unit for computing a sum of a primary resistance and a secondary resistance of the alternating-current rotating machine based on the orthogonal axis currents and the voltage command after the speed determination unit determines that the speed of the alternating-current rotating machine is zero and within a predetermined time after a point in time when the operation command is changed from a brake command to a power running command, and computing the primary resistance of the alternating-current rotating machine based on the orthogonal axis currents and the voltage command after a lapse of the predetermined time, the predetermined time being set to be shorter than a secondary time constant of the alternating-current rotating machine.

2. The power conversion apparatus of an electric vehicle according to claim 1, wherein:
  the alternating-current rotating machine is an induction machine; and
  the resistance computing unit computes a primary resistance and a secondary resistance of the induction machine.

3. The power conversion apparatus of an electric vehicle according to claim 2, wherein the control unit includes a motor abnormality sensing unit for sensing abnormal overheating of the induction machine and stopping the power converter based on the primary resistance and the secondary resistance of the induction machine.

4. A power conversion apparatus of an electric vehicle, comprising:
  a power converter for driving an alternating-current rotating machine; and
  a control unit for controlling the power converter based on an operation command, the control unit including
  a coordinate conversion unit for converting current information detected from the alternating-current rotating machine into orthogonal axis currents on orthogonal rotating coordinates,
  a speed determination unit for computing a voltage command for the power converter and determining speed of the alternating-current rotating machine based on the operation command and the orthogonal axis currents, and
  a resistance computing unit for computing a sum of a primary resistance and a secondary resistance of the alternating-current rotating machine based on the orthogonal axis currents and the voltage command after the speed determination unit determines that the speed of the alternating-current rotating machine is zero and within a predetermined time after a point in time when the operation command is changed from a brake command to a power running command, and computing the primary resistance of the alternating-current rotating machine based on the orthogonal axis current and the voltage command after a lapse of the predetermined time, the predetermined time being set to be shorter than a secondary time constant of the alternating-current rotating machine,
  if the alternating-current rotating machine is a synchronous machine, the resistance computing unit computes the primary resistance as a resistance of the synchronous machine.

* * * * *